(12) United States Patent
Fairhart (10) Patent No.: US 11,216,731 B2
(45) Date of Patent: Jan. 4, 2022

(54) APPARATUS AND PROCESS FOR VISUAL RECOGNITION

(71) Applicant: Alexander Fairhart, Bellevue, WA (US)

(72) Inventor: Alexander Fairhart, Bellevue, WA (US)

(*) Notice: Subject to any disclaimer, the term of this patent is extended or adjusted under 35 U.S.C. 154(b) by 97 days.

(21) Appl. No.: 16/838,370

(22) Filed: Apr. 2, 2020

(65) Prior Publication Data

US 2020/0327410 A1 Oct. 15, 2020

Related U.S. Application Data

(60) Provisional application No. 62/832,160, filed on Apr. 10, 2019.

(51) Int. Cl.
*G06N 3/08* (2006.01)
*G06K 9/46* (2006.01)
*G06N 3/04* (2006.01)

(52) U.S. Cl.
CPC .............. *G06N 3/08* (2013.01); *G06K 9/46* (2013.01); *G06N 3/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 2016/0086047 | A1* | 3/2016 | Suh ................... | G06K 9/6247 382/159 |
| 2017/0236000 | A1* | 8/2017 | Hwang .............. | G06K 9/6215 382/103 |
| 2019/0042940 | A1* | 2/2019 | Sakairi ............... | G06N 3/0454 |
| 2019/0114499 | A1* | 4/2019 | Delaye ............... | G06F 17/153 |
| 2019/0114541 | A1* | 4/2019 | Yang .................. | G06F 9/485 |
| 2020/0012806 | A1  | 1/2020 | Bates et al. | |
| 2020/0045289 | A1* | 2/2020 | Raziel ................ | G06N 3/084 |
| 2020/0065526 | A1  | 2/2020 | Berman | |

OTHER PUBLICATIONS

Pawel Korus, "Neural Imaging Pipelines—the Scourge or Hope of Forensics?", Feb. 27, 2019, Computer Vision and Pattern Recognition, arXiv: 1902.10707, pp. 1-10.*
Lakshmanan Nataraj, "Detecting GAN generated Fake Images using Co-occurrence Matrices", Jan. 13, 2019, Society for Imaging Science and Technology, IS&T International Symposium on Electronic Imaging 2019, Media Watermarking, Security, and Forensics 2019, pp. 532-1-532-4.*
Goodfellow, I. et al., Deep Learning, 2017, pp. 431-445, MIT Press, Cambridge, MA, USA.

* cited by examiner

*Primary Examiner* — Omar S Ismail
(74) *Attorney, Agent, or Firm* — Anthony Claiborne (57) ABSTRACT

An apparatus and a process improve the ability of computer systems to distinguish genuine from altered or fabricated media depictions of a subject. Three-dimensional depth data of the subject is multiplexed with visual data of the subject to create a tensor data structure. In one aspect, the invention utilizes the tensor to create a unique and characteristic watermark for any segment of the subject's depiction. In another aspect, the invention comprises a deep neural network trained with the tensor to provide enhanced image recognition of genuine depictions of the subject. Embodiments are particularly suited to detect sophisticated alterations and fabrications in photographic and video renditions of public figures.

7 Claims, 6 Drawing Sheets

$$z = \sum_n w_i x_i = \mathbf{w}^T \cdot \mathbf{x}$$

$$\hat{y} = g(z + b)$$

where:

$z$ is the dot product of the weight vector $w_i$ and the input signal vector $x_i$
$g$ is a non-linear function applied to sum $z$ with bias $b$
$\hat{y}$ is the output signal of the neuron

*Individual neuron behavior*
Fig. 4

$$z_i^{[q]} = \mathbf{w}_i^T \cdot \mathbf{a}^{[q-1]} + b_i$$
$$a_i^{[q]} = g^q(z_i^{[q]})$$

where:

$a^{[q]}$ is the activation vector for layer q
$g^{[q]}$ is the activation function for layer q

*Processing by a neural network layer*
Fig. 5

$$L = \sum \frac{1}{2}(target - output)^2$$

*Loss function as mean squared error*

*Fig. 6*

$$w = w_0 - \eta \frac{dL}{dw}$$

where:

w is weight
$w_0$ is original weight
$\eta$ is learning rate

*Parameter update*

APPARATUS AND PROCESS FOR VISUAL RECOGNITION

CROSS-REFERENCE TO RELATED APPLICATION

This application claims the benefit of U.S. provisional patent application No. 62/832,160, filed Apr. 10, 2019.

BACKGROUND OF THE INVENTION

Field of the Invention

This invention relates to visual processing functionality in computer systems. More specifically, this invention relates to structures employed to improve the performance of computer systems used to distinguish real from simulated depictions of individuals in visual media.

Description of the Related Art

The field of artificial intelligence research and development has grown exponentially in recent years, owing in large part to the development of computer hardware supporting deep neural network technology. In this technology, artificial systems are configured to have the ability to develop mathematical relationships between input data and desired system responses.

Modern applications of artificial intelligence to image recognition generally rely on deep neural networks to process data and derive relationships between visual input information and desirable identification of depicted objects based upon that information. By processing large datasets of visual information, these derived relationships can enable deep neural networks to reproduce human visual abilities, such as recognizing human faces.

These networks rely on structures that improve the reliability of their determination, or "learn", though iterative processing of data, or "training". Several inter-related technologies have converged in recent years to provide a framework for increasingly reliable artificial image recognition.

By exploitation of their visual processing capabilities, however, neural network devices can also be employed to build intricate mathematical models of real objects. Thereby, artificially intelligent agents can create media in which depictions of individual humans are simulated with such accuracy that distinguishing the simulation from an actual depiction of the individual is difficult or impossible, not only by a human observer but also by the artificially intelligent technology currently available. Such simulations, popularly called "deepfakes", can present real-world problems with profound ramifications, for example when deceptively offered as forensic proof in adjudications, or when disseminated in popular media for purposes of propaganda and social or political agitation.

Artificial intelligence technology has been employed in attempts to detect deepfakes in media. For example, large datasets of synthetic videos have been used to train artificial intelligence agents to detect certain deepfakes. By analyzing these datasets, an artificially intelligent system can develop mathematical relationships enabling the system to recognize deepfakes that are fabricated with synthetic videos identical or similar to those in its training datasets with a fairly high degree of accuracy. However, if deepfakes are based upon video data outside the training datasets, accuracy of deepfake detection by such systems falls off sharply.

As artificially intelligent visual processing technology grows more sophisticated, so does the urgency to deploy technology capable of detecting deepfakes. Failure to detect deepfakes accurately and reliably presents an ever increasing risk to the very fabric of modern society. What is needed is an accurate and reliable means of detecting simulated depictions of real individuals. What is further needed is such a means whose accuracy is not limited to a specific set of training data.

SUMMARY OF THE INVENTION

An improvement in computer functionality is provided by structures that enhance the ability of a visual data processing system to identify deepfakes. In operation, the invention's structures provide an enhanced dataset whereby genuine media reproductions may be distinguished from deepfakes, in one aspect by providing verifiable unaltered media, and in another aspect by providing training data for a specialized deep neural network with superior image recognition capability.

In conjunction with recordation by camera of pixelated visual data of a subject, an apparatus scans and stores distance measurements from a fixed source to the target of each pixel or set of pixels in the subject, the set of such distance measurements comprising a data structure defining a topography of the subject. An enhanced dataset for the subject image is a multiplexed combination of this visual and distance data. Common embodiments of the invention comprise visual data as red-green-blue (RGB) raster graphics values, combined with distance data (D), to form of 4-tuples, RGB-D, each 4-tuple corresponding to a point on the subject, the set of 4-tuples forming a data tensor.

Embodiments in one aspect of the invention utilize the distance component of the data tensor to create a kind of watermark or signature, whereby genuine copies of the data tensor may be distinguished from altered copies of the data tensor and its component visual data file, including deepfakes.

In embodiments in another aspect of the invention, the data tensor comprising the visual-distance data from a single image of the target individual is provided as input to a deep neural network (DNN) configured iteratively to perform forward propagation, loss function computation, back propagation and parameter update on this data structure, with program structure to apply a form of gradient descent to the data transformed by non-linear function so that weighting factors are resolved in favor of minimizing identification error. The process is repeated with visual-distance tensor datasets from different images of the target individual along with tensor datasets of other individuals and other objects that are provided for comparison to refine recognition of the target individual. With appropriate processing for error minimization, a generalized representation of the target individual is created in the DNN. The resultant trained DNN, when subsequently provided with standard RGB digital images for evaluation, effectively cross-compares the evaluation images with the generalized representation of the genuine target that the DNN has obtained from training. Thereby, embodiments in this aspect distinguish deepfakes from genuine images in evaluation images more successfully than is possible with systems available in the prior art.

The teachings of the invention herein may be applied to either still or moving video images of target individuals.

BRIEF DESCRIPTION OF THE DRAWINGS

Objects of the present invention as well as advantages, features and characteristics, in addition to methods of operation, function of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF THE INVENTION

Aspects of the present invention utilize a tensor composed of multiplexed visual and distance data of a subject or object. Embodiments comprise program structures to process data from visual and distance data sources to create the needed tensor.

Figure 1:
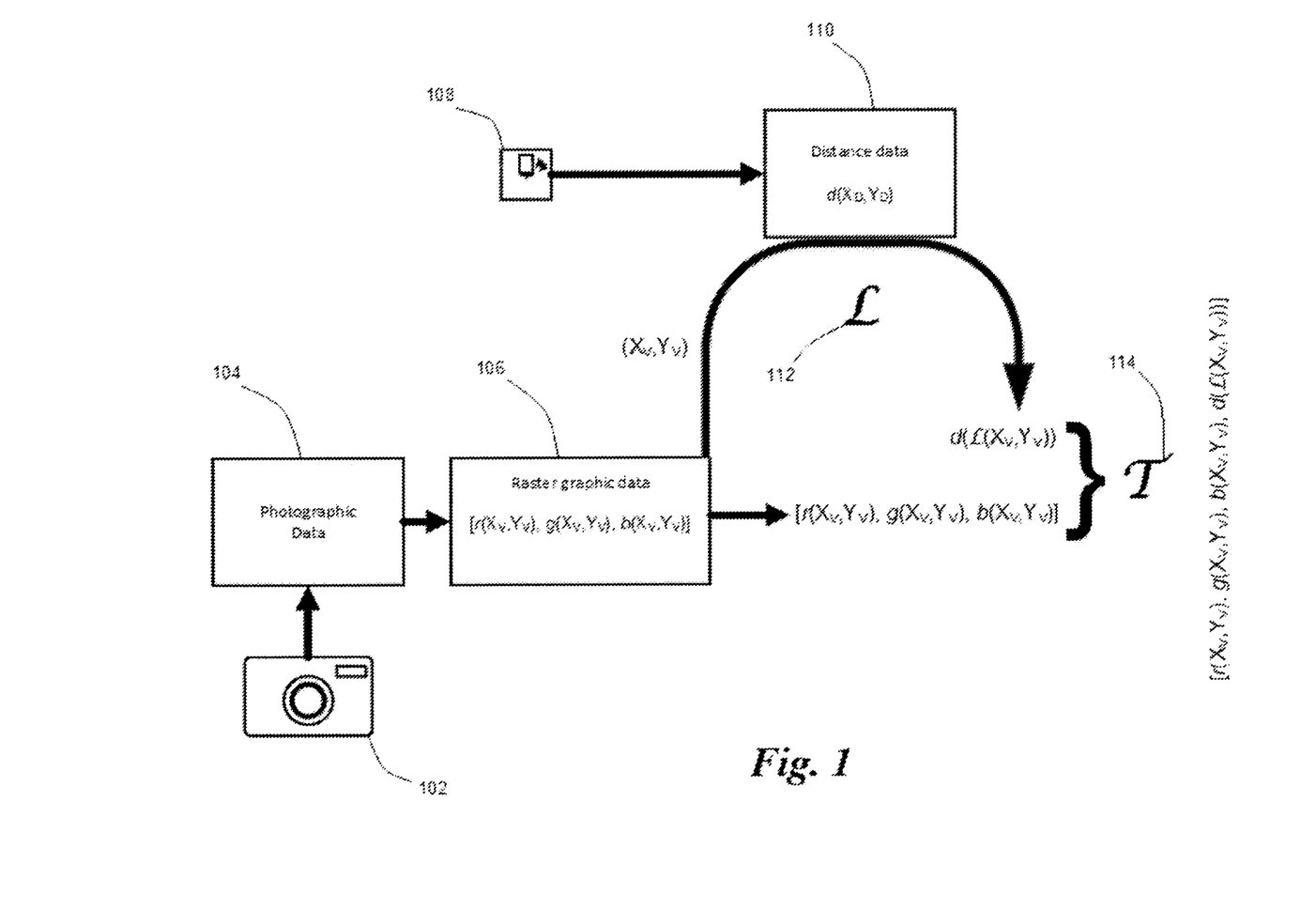
FIG. 1 shows the steps in obtaining photographic and distance data, transforming and combining data to form the data tensor employed in embodiments of the invention.

Turning to FIG. 1, in some embodiments of the invention, camera 102 supplies visual data 104 representing the subject image by recording the subject. Depending upon the application needed for the invention, camera 102 may be of a kind configured to take still digital photographs, in which case visual data 104 is photographic data, or a kind configured to record moving videos, in which case visual data 104 is video data. In any case, by algorithmic transformation of a subset of visual data 104, a raster graphic dataset 106 can be created by methods well-known to those of skill in the art. In the depicted embodiment, raster graphic dataset 106 is a two-dimensional matrix of triplets, representing visual data of RGB values for pixels in the $X_V, Y_V$ plane, the plane of projection for the photograph of the subject, or $[r(X_V, Y_V), g(X_V, Y_V), b(X_V, Y_V)]$.

A distance scanning device 108, such as the exemplary LIDAR-based scanning rangefinder described in reference to FIG. 2 below, supplies distance data 110 which, in the depicted embodiment, is resolved into a two dimensional matrix of distance values for each point $(X_D, Y_D)$ in the topographic reference plane, or $d(X_D, Y_D)$.

Each point $(X_V, Y_V)$ in the visual plane of projection corresponds to a point $(X_D, Y_D)$ in the topographic reference plane. As will be understood by those in the art, since the resolution of some distance scanners employed in some embodiments of the invention (such as the exemplary LIDAR-based scanning rangefinder depicted in FIG. 2) may be considerably coarser than the standard resolution of most cameras, the correspondence from points in the distance data matrix to points in the visual data matrix may be one-to-many.

In any case, as will be yet further understood by those of skill in the art, obtaining the values $(X_D, Y_D)$ for the coordinates of several reference points in the distance data 110 that correspond to the values $(X_V, Y_V)$ of the same reference points in the raster graphic dataset 106 enables the derivation of a transform function 112, $\mathcal{L}$, so that the point $(X_V, Y_V)$ in the raster graphic dataset 106 maps to the same point $(X_D, Y_D)$ in the distance data 110 by applying transform function 112, $\mathcal{L}(X_V, Y_V)$ to the visual data coordinate. In these embodiments, then, the multiplexed data tensor 114, $\mathcal{T}$ comprises 4-tuples $[r(X_V, Y_V), g(X_V, Y_V), X_V, Y_V), d(\mathcal{L}(X_V, Y_V))]$ over the range of dimensions $(X_V, Y_V)$ of the visual field of a still image.

The process of creating a tensor with distance data for a single still image can be generalized for the creation of a tensor datafile for moving video images. As is well-known in the art, video data may be characterized simply as a sequence of frames of static visual data presented over time. Accordingly, a generalized tensor embodying video images is constructed in embodiments of the invention as time-dependent 4-tuples of the form $[r(X_V(t), Y_V(t)), g(X_V(t), Y_V(t)), b(X_V(t), Y_V(t)), d(\mathcal{L}(X_V(t), Y_V(t)))]$, or video tensor $\mathcal{T}(t)$.

Differing embodiments of the invention may obtain the visual data 104 and distance data 110 required to create the multiplexed data tensor 114 by various hardware and software means. For example, a time-of-flight 3D camera such as the SICK Ranger D camera from SICK Vertriebs-Gmbh of Düsseldorf, Germany, can provide a complex dataset from which software can derive the required multiplexed data tensor 114.

Alternatively, a so-called "point cloud" of data can be obtained from a stereo vision camera such as the Tara USB 3.0 Stereo Vision Camera manufactured by e-con Systems Inc. of Guindy, Chennai, India and available from a sales office in San Jose, Calif. A point cloud is a set of data points in space that can be converted into a 3 dimensional surface representation of an object. As will be familiar to those in the art, there are dozens of different point cloud formats, including: OBJ from Wavefront Technologies; PLY or Stanford triangle format; PCG, RCS, and RCP formats from Autodesk; E57, a widely used vendor-neutral format; and various forms of XYZ formatted representations in both ASCII and binary coded data. Embodiments of the present invention can utilize data transformation from any of these formats to create the multiplexed data tensor 114 required for the present invention.

However, a relatively simple hardware device, a LIDAR-based scanning rangefinder, is employed in conjunction with a conventional digital camera in some embodiments of the invention. A principal advantage in employing such a device is that the data required for operation of the invention in training mode is easily obtained and manipulated without complex software processing.

Figure 2:
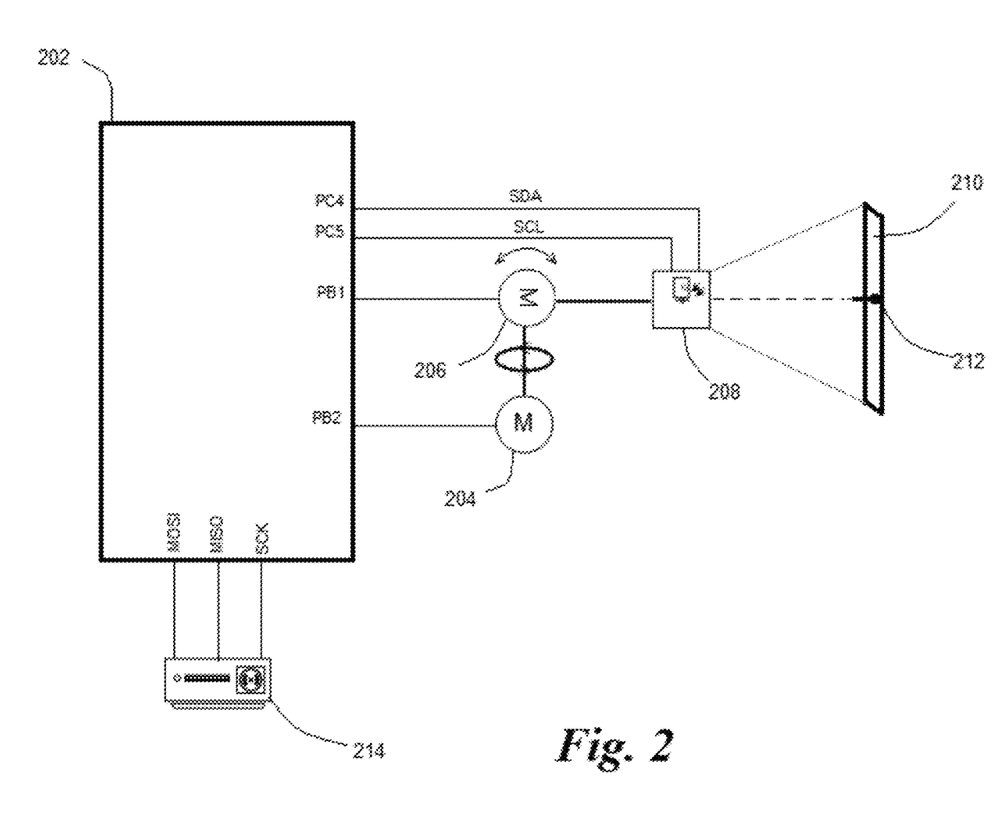
FIG. 2 is a schematic of a scanning LIDAR range finder component of an embodiment of the invention.

Turning now to FIG. 2, depicted is a diagram of a LIDAR-based scanning rangefinder according to an embodiment of the invention. A micro-controller 202, such as the ATmega328P-based Arduino Uno from Arduino, LLC (with U.S. headquarters in Somerville, Mass.), is electronically connected via control lines to a first servo-motor 204 and a second servo-motor 206. First servo-motor 204 and second servo-motor 206 are mechanically connected each other and azimuthally mounted to LIDAR device 208, for which the depicted embodiment employs the Garmin LIDAR-Lite Optical Distance Sensor, manufactured by Garmin, Ltd. of Olathe, Kans. LIDAR device 208 is electronically connected to micro-controller 202, to which it transmits data corresponding to the distance to an object to which it is pointed. In the depicted embodiment LIDAR device 208 communicates with micro-controller 202 via the i2C protocol, familiar to those of skill in the art.

By way of azimuthal rotation of first servo-motor 204 with second servo-motor 206 under control of micro-controller 202, LIDAR device 208 is manipulated to focus on a designated point 212 within field of view 210 and report the distance to point 212 to micro-controller 202. By controlled focusing and distance measurements over field of view 210, the invention is able to obtain data comprising a topological scan of points in the field of view 210.

Micro-controller 202 communicates over a communication interface with storage device 214. As depicted, memory storage device 214 is an SD card writer, such as the microSD Transflash Breakout available from Spark Fun Electronics, Inc. of Niwot, Colo. In the depicted embodiment, micro-controller 202 communicates data for storage to storage device 214 via a serial peripheral interface (SPI), familiar to those of skill in the art.

Micro-controller 202, having received distance data from LIDAR device 208 on a point 212 in field of view 210 via i2C interface as described above, transmits the distance data from point 212, along with corresponding positions of first servo-motor 204 and second servo-motor 206, for storage in a matrix data structure in memory storage device 214. With appropriate programming, such as set forth in the exemplary software code provided at the end of this specification, the LIDAR-based rangefinder can produce a two-dimensional matrix representing distance values for points in the $X_D$, $Y_D$ plane, the reference plane of the topography of the subject, or $d(X_D, Y_D)$.

In some aspects of the invention, the distance data contained in a still image tensor $\mathcal{T}$ or in a video tensor $\mathcal{T}(t)$, as described in reference to FIG. 1 above, can serve as a kind of watermark for the recording. Embodiments in this aspect create a characteristic code or digital watermark, such as a systematic code (for example a hash code or a checksum), or a non-systematic code (such as a convolutional code), for the entire tensor file or a segment thereof. Methods for creating of such codes from data is well-known in the computing arts. The characteristic code is then stored in physical media in the metadata of a file containing corresponding image data. The authenticity of a file containing the image data can be verified by comparing the identification code derived from the original tensor file, written in the metadata of an authentic file, with corresponding code in any other file under consideration. If the visual data from an original file has been altered to create a deepfake, any identification code in the altered file is highly unlikely to match the identification code derived from original tensor data written in the metadata of an authentic file. Accordingly, in these aspects of the invention, the multiplexed visual and distance data of the invention enable the detection of deepfakes.

Figure 3:
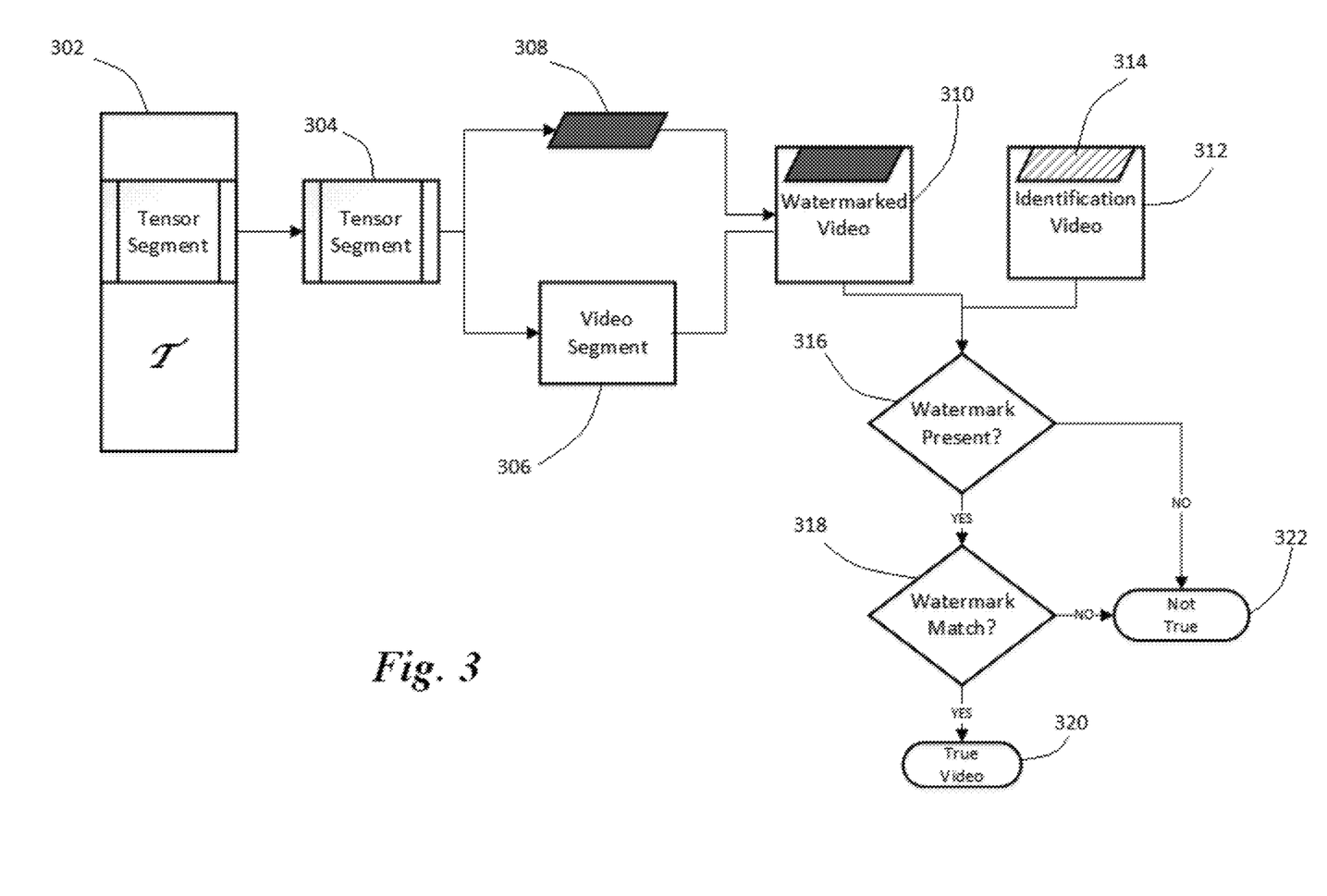
FIG. 3 is a flowchart depicting an aspect of the invention in which a characteristic code is generated from the invention's data tensor, used to distinguish fake from genuine media files.

An embodiment of the foregoing aspect of the invention is illustrated in FIG. 3, depicting use of watermarking to verify the authenticity video segments that were recorded in a tensor file of multiplexed video and distance data according to the teachings of the invention. In the depicted embodiment, a tensor segment 304 containing a specified video depiction is copied from tensor file 302. Program structures of the invention extract video segment 306 from tensor segment 304. Invention program structures also operate on the data of tensor segment 304 to create characteristic code 308 based upon the content of tensor segment 304. A watermarked video file 310 is created by storing the characteristic code 308 of tensor segment 304 in the metadata of watermarked video file 310.

The invention is operative to verify the authenticity of an identification video 312 by way of a first test 316 to determine whether an identification code 314 is present in identification video 312. If identification video 312 has an identification code 314 and thereby passes first test 316, a second test 318 is conducted to determine whether the identification code 314 matches characteristic code 308. The invention identifies identification video 312 as not true 322 if identification video fails first test 316 or second test 318. An identification video 312 is identified as true video 320 if it passes both first test 316 and second test 318.

In other aspects of the invention, still image tensors $\mathcal{T}$ or video tenors $\mathcal{T}(t)$ are provided in series as input data tensors to a deep neural network for training and performing image recognition.

The problem of image recognition is one of matching image data to an image label, for example matching the image of a famous figure to the identity of the figure. In image recognition training, the image label is abstracted to a target that identifies the image. The image data used as input for neural network vision recognition typically comprises matrices of pixels in a digitized representation of the target image. In the prior art, a typical input matrix comprises a 2-dimensional array of 3-tuple (triplet) elements, corresponding to the red, green and blue values of each pixel in the two-dimensional rendering of the image represented by the data.

Deep neural networks in vision recognition rely on data processes that use multiple layers for progressively extracting higher level features starting with raw input of matrix data corresponding to an image of the target. Layers in deep neural networks are comprised of interconnected artificial neurons capable of receiving and sending signals. Input matrix data is presented to the input layer in a neural network for further propagation and processing by successive connected layers.

Figure 4:
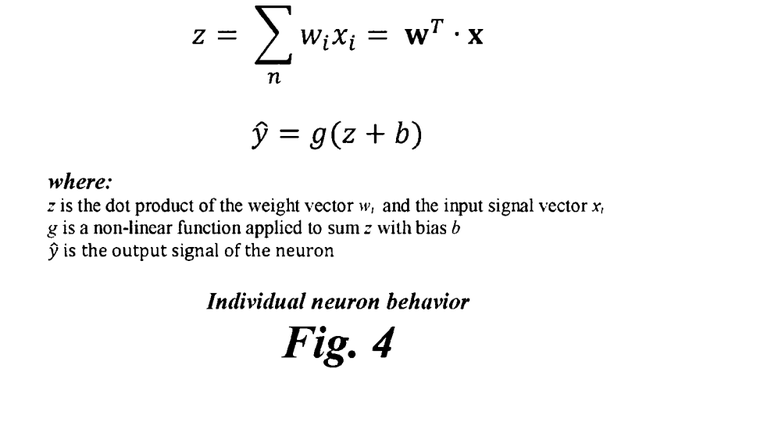
FIG. 4 comprises formulae describing individual neuron behavior in a neural network in an embodiment of the invention.

In layers above the input layer, a given neuron in the network can receive an input signal from every neuron to which it is connected. Signals in deep neural networks used for image recognition are simply real number values. As described above, in the prior art these values are generally in the form of triplets, in correspondence with the pixel values provided to the input layer. For the given neuron, a weight is associated with the signal from each connected neuron. In operation, the given neuron accumulates the weighted signals from connected neurons, adding a bias value to the sum. The neuron then applies an advantageously selected non-linear function to the biased sum to produce an output signal. This operation is portrayed symbolically in FIG. 4.

Figure 5:
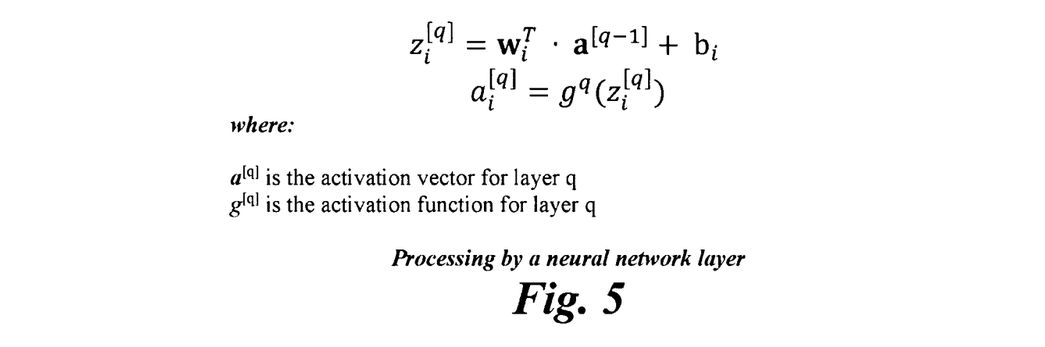
FIG. 5 comprises formulae describing processing by a neural network layer according to an embodiment of the invention.

Neurons in turn are organized into layers within the neural network. A given layer receives input volume as a vector of signals from a preceding layer. This vector of signals is referred to as the activation of the preceding layer. By applying their individual weighting and bias to the preceding layer's activation, the neurons in the given layer generate a weighted bias vector to which a non-linear function, called an activation function, is applied to generate an output volume vector, which in turn is the activation for the given layer and provides input volume data for the succeeding layer of the neural network. This process is illustrated symbolically in FIG. 5.

Training a neural network entails repeated iterations of signaling across layers of neurons. With each iteration, neural network processing alters the weight vector and the bias for each neuron. This training creates a learning model in the network, as further explained below.

Figure 6:
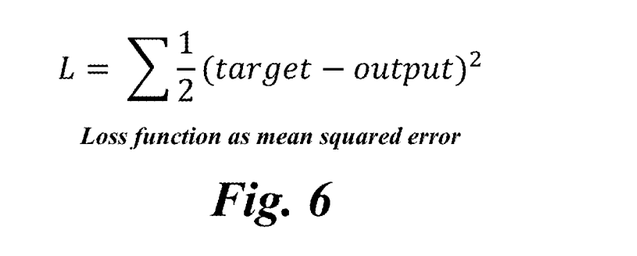
FIG. 6 is an exemplary loss function formula such as used in embodiments of the invention.

Typical deep neural networks comprise many layers. The progression of data volume from lower layers to higher layers is referred to as forward propagation. When the data volume passes through the highest level, an assessment of error is made by comparing the output volume to the image target. A loss function is applied to compute a loss value based upon the difference between the value of the target and the value of the output. A typical loss function is shown in FIG. 6.

After applying a loss function to derive the loss value, the neural network performs a back propagation. In back propagation, levels are traversed in reverse order beginning at the highest level. A combination of program and data structures are employed to determine which weights on each level contribute most to the loss value. This is equivalent to computing the loss gradient dL/dW over the current weighting values Won each layer.

Figure 7:
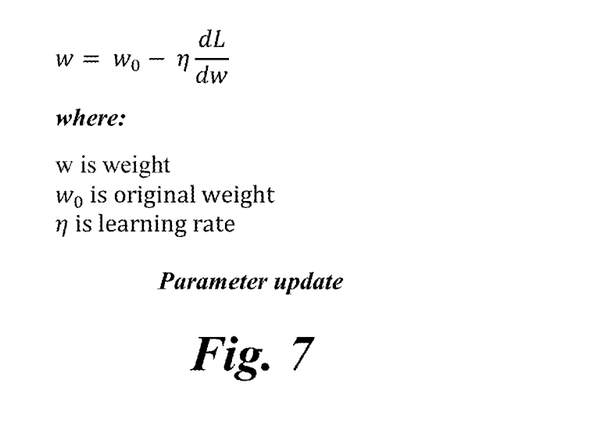
FIG. 7 is a formula illustrating a parameter update resulting from gradient descent operations in embodiments of the invention.

Advantageously, a form of gradient descent is applied to the layers of the neural network in an effort to optimize performance by reducing the loss value. Application of gradient descent operations results in values for a parameter update that changes weighting in a direction opposite to that of the loss gradient, as illustrated symbolically in FIG. 7.

The learning rate η is a value chosen by the programmer of the network. With higher learning rates, bigger steps are taken in weight updates and thus the learning model converges on an optimized set of weights quickly. However, if the learning rate is too high, large jumps in weight values between training iterations can result in a lack of precision that may cause the model to miss an optimal match between output and target.

A training iteration of the neural net comprises the processes of forward propagation, loss function computation, back propagation and parameter update. Training iteration is repeated to a local minimum of the loss gradient, and thereby the weights of the layers are sufficiently tuned to provide an acceptable loss value between the target image and the network output.

The network, now optimized for response with respect to a first set of input matrix data corresponding to one image of the target object, is next presented with another set of input matrix data corresponding to a different image of the same target object, and the training process is repeated. With optimized tuning resulting from effective training with a sufficiently large variety of images of the target object and by applying an appropriate learning rate, a deep neural network can exhibit the ability accurately to identify objects and (significantly) individual humans depicted in digital images.

Figure 8:
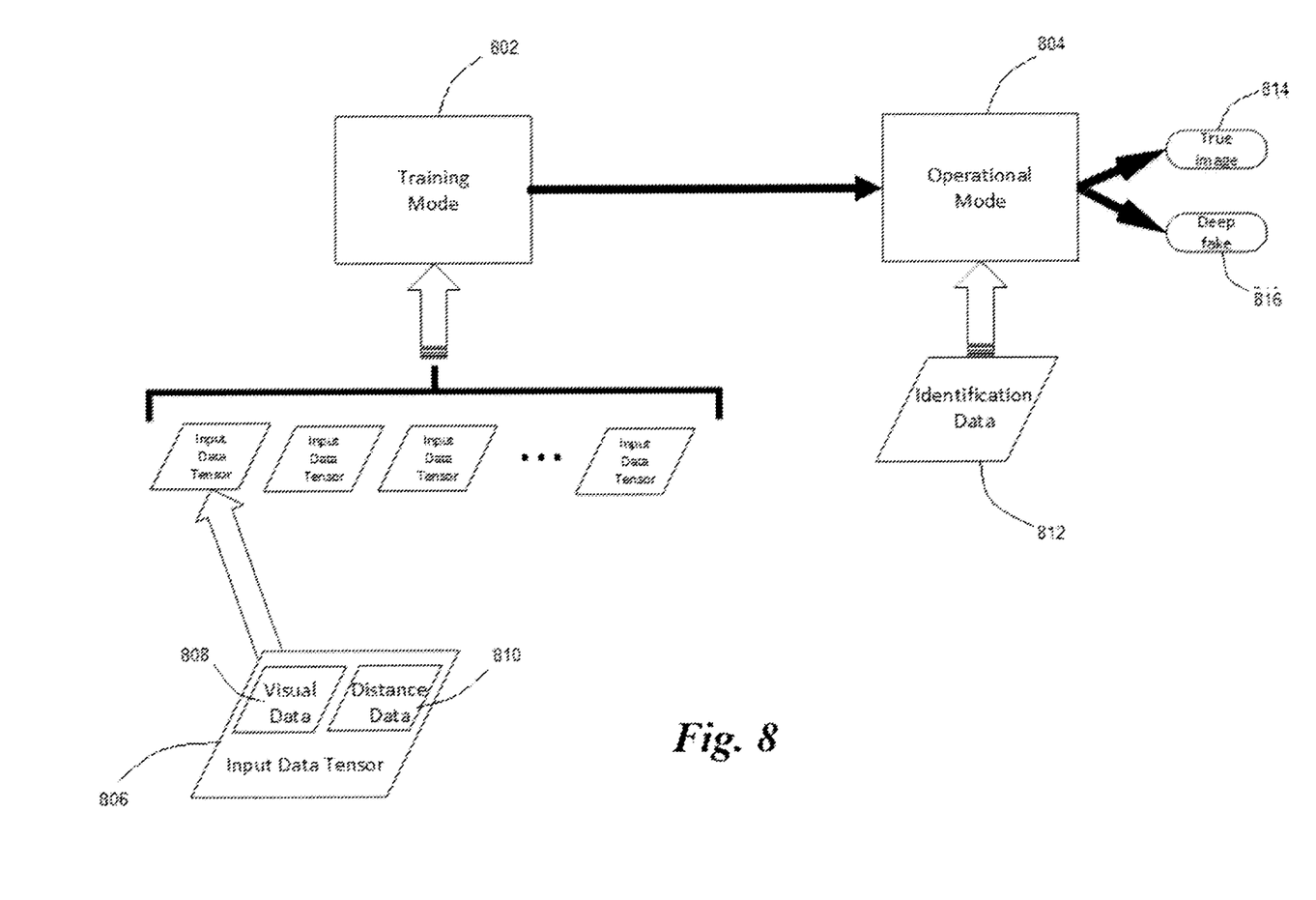
FIG. 8 is a block diagram illustrating the overall operation of an aspect of the invention utilizing a deep neural network for image recognition.

Turning now to FIG. 8, illustrated is a block diagram of the overall operation of embodiments of one aspect of the current invention. In this aspect, the invention as depicted has two modes: a training mode 802 and a test mode 804.

In training mode 802, the invention depicted in this embodiment is provided a series of sets of input data tensors 806, each input data tensor 806 comprising multiplexed visual data 808 and distance data 810 representations of an image which may be of the target individual or some other object. Identification error is determined when the system misidentifies an image of another object as the target individual. For each input data tensor 806, iterative forward propagation, loss function computation, back propagation and parameter update are performed on this data structure until identification error is at an acceptably low level. Input data tensor 806 of other images of the target individual are subsequently similarly treated until the system is sufficiently trained, as described in more detail in reference to subsequent figures, at which point the system may be placed in test mode 804.

Acceptable identification error values will depend somewhat on the total number of input data tensors that are used in training. Values may also depend on the relative proportions of input data tensors for target individuals versus input data tensors for other objects. Acceptable identification error will further depend upon the nature of the objects represented in the input data tensors: when a significant number of the objects represented in the input data tensors are individuals similar to the target individual, lower identification error values may be preferred. Identification error tolerance clearly will depend upon the criticality of accurate identification of target individuals. In any case, preferred embodiments may be trained to an aggregate identification error of 15% or lower, but embodiments with an aggregate identification error up to 65% can still be useful for identifying deepfakes.

Turning to test mode 804, the system is presented with identification data 812, comprising visual data representing an image for which identification is desired. In test mode 804, the system, having completed training mode 802, is able to provide a response as to whether the identification data 812 represents a true image 814 or a deepfake 816.

Although the present system has been described in terms of various embodiments, it is not intended that the system be limited to or constrained by these embodiments. In this specification, a number of simplifications have been made for ease of illustration. Specifically, the invention's data tensor has been described in terms of a format comprised of raster graphic data combined with distance matrix data. However, because the raster graphic data format has significant limitations regarding storage, processing and display, in general the visual data that is recorded by commercially available cameras, whether for still images or for video depictions, is of a considerably more complex structure than the raster graphic data described in respect to embodiments of the invention herein. A wide range of data formats, many of them proprietary, are employed in commercial cameras. As is well understood by those in the art, visual data from any of digital camera datafile can be transformed algorithmically into the raster graphic data employed in embodiments of the invention, and thereby a person of skill in the art is able to practice such embodiments without requiring undue experimentation.

Further, while the particular embodiment of a LIDAR-based rangefinder described herein creates topographic datafiles of subjects as required by embodiments of the invention, its scan rate is relatively slow and far too slow to be generally useful in creating topographic files for moving video data. Other means of creating topographic files may be employed in keeping with the spirit of the invention. Such means may simply be LIDAR-based scanners with a more rapid scan rate. Alternatively, other means can be employed providing distance data in various formats, including the many forms of point cloud data described previously. As will be understood by those in the art, the distance data provided by any such means can be transformed by appropriate algorithmic processes into the two-dimensional distance data matrix employed in embodiments of the invention. Some of these devices and data formats may also provide the visual data employed by the invention.

Yet further, while the input data tensor of the present invention has itself been illustrated as consisting of a format comprised of raster graphic data combined with distance matrix data, it will be appreciated by those of skill in the art that the teachings of the invention can be generalized to tensors that incorporate positional visual data with positional distance data of many different formats.

Yet further still, while the accumulation of data, the alignment and transform of coordinates and the creation of the input tensor for the present invention have been described in terms of discrete sequential steps, it will be understood by those of skill in the art that, with sufficient data transfer and processing speed, the invention can be practiced on the fly, processing and interpreting visual and distance data in near real-time.

While the invention has been described with a certain degree of particularity, it should be recognized that elements thereof may be altered by persons skilled in the art without departing from the spirit and scope of the invention. Accordingly, the present invention is not intended to be limited to the specific forms set forth herein, but on the contrary, it is intended to cover such alternatives, modifications and equivalents as can be reasonably included within the scope of the invention. The invention is limited only by the claims herein and their equivalents.

```
/*********************************************************************************
/* Exemplary LIDAR control code, providing data for a matrix of distance values.
/* Matrix is an ASCII file of tab-separated distances, 30 to a row, 30 rows each separated by
/* carriage returns in this exemplary implementation.
/*
/* If row number is gamma and entry within the row is theta, then the value stored at
/* (gamma,theta) represents the distance recorded for displacements of gamma degrees on the
/* horizontal servo and theta degrees on the vertical servo.
/*
/*********************************************************************************/
#include <Wire.h>  // i2C driver
#include <SPI.h>   // SPI driver
#include <SD.h>    // SD card driver
#define   LIDARLite_ADDRESS     0x62         // Default I2C Address of LIDAR-Lite.
#define   RegisterMeasure       0x00         // Register to write to initiate ranging.
#define   MeasureValue          0x04         // Value to initiate ranging.
#define   RegisterHighLowB      0x8f         // Register to get High and Low bytes in 1 call.
#include <Servo.h>
const int field_width_X = 30; // width of field of horizontal field of view in degrees, here 30
const int field_width_Y = 30; // width of field of vertical field of view in degrees, here 30
Servo myservo_X;
Servo myservo_Y;
int pos_X = 0;              // Position of the servo (degrees, [0, field_width_X])
int pos_Y = 0;              // Position of the servo (degrees, [0, field_width_Y])
int distance = 0;           // Distance measured
void setup( )
{
    // Serial output
    Serial.begin(9600);
    Serial.println("< START >");
    // Servo control
    myservo_X.attach(5);
    myservo_Y.attach(6);
    // LIDAR control
    Wire.begin( ); // join i2c bus
    // SD control
    SD.begin( ); // set up SPI, may need to pass chip select as parameter
    //make one scan
    main( );
    Serial.println("< END >");
}
// Get a measurement from the LIDAR Lite
int lidarGetRange(void)
{
    int val = -1;
    Wire.beginTransmission((int)LIDARLite_ADDRESS); // transmit to LIDAR-Lite
    Wire.write((int)RegisterMeasure); // sets register pointer to (0x00)
    Wire.write((int)MeasureValue); // sets register pointer to (0x00)
    Wire.endTransmission( ); // stop transmitting
    delay(5); // Wait 5ms for transmit
    Wire.beginTransmission((int)LIDARLite_ADDRESS); // transmit to LIDAR-Lite
    Wire.write((int)RegisterHighLowB); // sets register pointer to (0x8f)
    Wire.endTransmission( ); // stop transmitting
    delay(5); // Wait 5ms for transmit
    Wire.requestFrom((int)LIDARLite_ADDRESS, 2); // request 2 bytes from LIDAR-Lite
    if(2 <= Wire.available( )) // if two bytes were received
    {
        val = Wire.read( ); // receive high byte (overwrites previous reading)
        val = val << 8; // shift high byte to be high 8 bits
        val |= Wire.read( ); // receive low byte as lower 8 bits
    }
    return val;
}
```

```
// Main routine, performs one scan, writes a 30 X 30 matrix
int main( )
{
    String dataString;
    for(pos_X = 0; pos_X <= field_width_X; pos_X += 1)
    {
        dataString = "";
        myservo_X.write(pos_X);
        for(pos_Y = 0; pos_Y <= field width_Y; pos_Y += 1)
        {
            myservoY.write(pos_Y);
            distance = lidarGetRange( );
            if (pos_Y > 0)
                dataString += '\t'; // tab separation
            dataString += String(distance);
            delay(5);
        }
        File dataFile = SD.open("topofile.txt", FILE_WRITE);
        dataFile.println(dataString);
        dataFile.close( );
    }
}
void loop( )
{ }
```

I claim:

1. A method of creating a physical medium containing a file of visual data with authentication watermark, comprising:
   recording coordinate-based visual data depicting a subject and simultaneously recording coordinate-based distance data of the subject;
   if a common coordinate basis is not present, transforming the coordinate basis of at least one of the visual data coordinates and the distance data coordinates into the common coordinate basis;
   multiplexing at least a portion of the recorded visual data with a corresponding portion of the recorded distance data on the common coordinate basis to create a tensor;
   processing the tensor to create a digital watermark of the subject; and
   storing the digital watermark in the physical medium containing the file of visual data depicting the subject.

2. The method of creating a physical medium containing a file of visual data with authentication watermark according to claim 1, wherein
   the step of storing the digital watermark in the physical medium containing the file of visual data depicting the subject comprises storing the file of visual data encoded with the watermark as systematic code on the physical medium.

3. A method of creating a deep neural network capable of identifying authentic depictions of a target subject in media, comprising the steps of
   creating a plurality of training data files, each training data file containing multiplexed visual and distance data representing an object of interest and wherein at least some of the training data files represent the target subject;
   on a deep neural network, conducting a training session for each training data file, each training session comprising
       providing the training data file as input data tensor to the deep neural network, and
           processing the input data tensor on the deep neural network by iteratively applying forward propagation, loss function computation, back propagation and parameter update,
           with each iteration, determining identification error of the deep neural network in identifying the object of interest as the target subject,
       until identification error for the training session has reached a pre-determined acceptably low value.

4. A method of creating a deep neural network capable of identifying authentic depictions of a target subject in media according to claim 3, wherein the pre-determined acceptably low value of the identification error in the training sessions is less than 65% in the aggregate.

5. A method of creating a deep neural network capable of identifying authentic depictions of a target subject in media according to claim 3, wherein the pre-determined acceptably low value of the identification error in the training sessions is less than 15% in the aggregate.

6. A method of creating a deep neural network capable of identifying authentic depictions of a target subject in media, comprising the steps of
   creating a plurality of training data files, each training data file containing multiplexed visual and distance data representing an object of interest and wherein at least some of the training data files represent the target subject;
   on a deep neural network, conducting a training session for each training data file, each training session comprising
       providing the training data file as input data tensor to the deep neural network, and iteratively
           processing the input data tensor on the deep neural network,
           with each iteration, determining identification error of the deep neural network in identifying the object of interest as the target subject,
       until identification error for the training sessions is less than 65% in the aggregate.

7. The method of creating a deep neural network capable of identifying authentic depictions of a target subject in media according to claim 6, wherein identification error for the training sessions is less than 15% in the aggregate.

* * * * *